United States Patent
Maghoul et al.

(10) Patent No.: US 8,812,511 B2
(45) Date of Patent: Aug. 19, 2014

(54) TIME BASED ORDERING OF PROVIDED MOBILE CONTENT

(75) Inventors: Farzin Maghoul, Hayward, CA (US); Shiv Ramamurthi, San Francisco, CA (US)

(73) Assignee: Yahoo! Inc., Sunnyvale, CA (US)

(*) Notice: Subject to any disclaimer, the term of this patent is extended or adjusted under 35 U.S.C. 154(b) by 0 days.

(21) Appl. No.: 13/401,515

(22) Filed: Feb. 21, 2012

(65) Prior Publication Data

US 2012/0150868 A1 Jun. 14, 2012

Related U.S. Application Data

(63) Continuation of application No. 11/999,366, filed on Dec. 4, 2007, now Pat. No. 8,145,643.

(51) Int. Cl.
*G06F 17/30* (2006.01)
(52) U.S. Cl.
USPC ............................................. 707/746
(58) Field of Classification Search
None
See application file for complete search history.

(56) References Cited

U.S. PATENT DOCUMENTS

| | | | |
|---|---|---|---|
| 6,892,196 B1 | 5/2005 | Hughes | |
| 7,844,594 B1 * | 11/2010 | Holt et al. | 707/709 |
| 7,970,991 B2 | 6/2011 | Abe | |
| 8,112,425 B2 * | 2/2012 | Baum et al. | 707/746 |
| 2006/0031216 A1 * | 2/2006 | Semple et al. | 707/4 |
| 2006/0122872 A1 | 6/2006 | Stevens et al. | |
| 2006/0282408 A1 | 12/2006 | Wisely et al. | |
| 2007/0061363 A1 | 3/2007 | Ramer et al. | |
| 2008/0172372 A1 | 7/2008 | Shacham et al. | |
| 2009/0037396 A1 | 2/2009 | Uematsu et al. | |
| 2009/0077055 A1 | 3/2009 | Dillon et al. | |
| 2009/0216746 A1 | 8/2009 | Aubin et al. | |

OTHER PUBLICATIONS

Official Communication in U.S. Appl. No. 11/999,366 dated Mar. 29, 2010.
Official Communication in U.S. Appl. No. 11/999,366 dated Oct. 13, 2010.
Official Communication in U.S. Appl. No. 11/999,366 dated Jan. 20, 2011.
Official Communication in U.S. Appl. No. 11/999,366 dated May 6, 2011.
Official Communication in U.S. Appl. No. 11/999,366 dated Dec. 27, 2011.

* cited by examiner

*Primary Examiner* — Bai D. Vu
(74) *Attorney, Agent, or Firm* — James J. DeCarlo; Greenberg Traurig, LLP

(57) ABSTRACT

A method, system, and apparatus are directed to providing information over a network. A search query may be received. If the search query includes at least one keyword matching a pattern associated with a specific search engine, a plurality of search results is retrieved from the specific search engine based on the keyword, and the plurality of search results is provided. A plurality of potential search or source engines may be determined based on a current time information. At least one of the potential search or source engines may be a personalized source engine. At least one plurality of results may be retrieved from at least one of the potential search or source engines. The result may be based on the search query. An aggregated result may be determined based on a time rule and/or the current time information. The aggregated result may comprise the plurality of results.

20 Claims, 7 Drawing Sheets

| User(s) | Pattern | Time | Engine | Action |
|---|---|---|---|---|
| Client0 | --- | ENTERTAINMENT | SearchEngine0 | Order Search Result + 1 |
| Client1 | --- | 6:00pm-10:00pm PST | SearchEngine1 | Feature Search Result |
| --- | --- | 6:00am-10:00am EST | EST TRAFFIC | Order Search Engine + 1 |
| Client1 | --- | 9:00am-6:00pm | SE-NEWS | Order Search Result Set -1 |
| CLASS0 | *\SBridge | RUSHHOUR EST | EST TRAFFIC | Feature Search Result |
| CLASS1 | [A-Z]+ | 5:00AM-1:00PM PST | SE-FINANCE | Select Search Engine |
| Client3 | --- | --- | Personalized Src | Provide Personalized Result |
| --- | --- | HOLIDAY | SE-HOLIDAY | Order Search Result + 2 |
| CLASS3 | --- | NOT_ADVERTISE | SE-ADVERTISE | Remove Search Engine |

FIG. 6

TIME BASED ORDERING OF PROVIDED MOBILE CONTENT

RELATED APPLICATION

This application is a Continuation of U.S. patent application Ser. No. 11/999,366 entitled "Time Based Ordering of Provided Mobile Content," filed on Dec. 4, 2007, the benefit of which is claimed under 35 U.S.C. §120, and which is incorporated herein by reference.

FIELD OF THE INVENTION

The present invention relates generally to providing mobile content, and more specifically, but not exclusively, to providing mobile content ordered based on a time.

BACKGROUND

Mobile devices have become a major mechanism of communication. Search on mobile devices has also become increasingly popular. However, providing appropriate search queries or receiving relevant search results appropriate for a mobile device remains challenging. It is with respect to these considerations and others that the current invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 6 shows one embodiment of a plurality of time rules in accordance with the present invention.

DETAILED DESCRIPTION OF THE INVENTION

Figure 1:
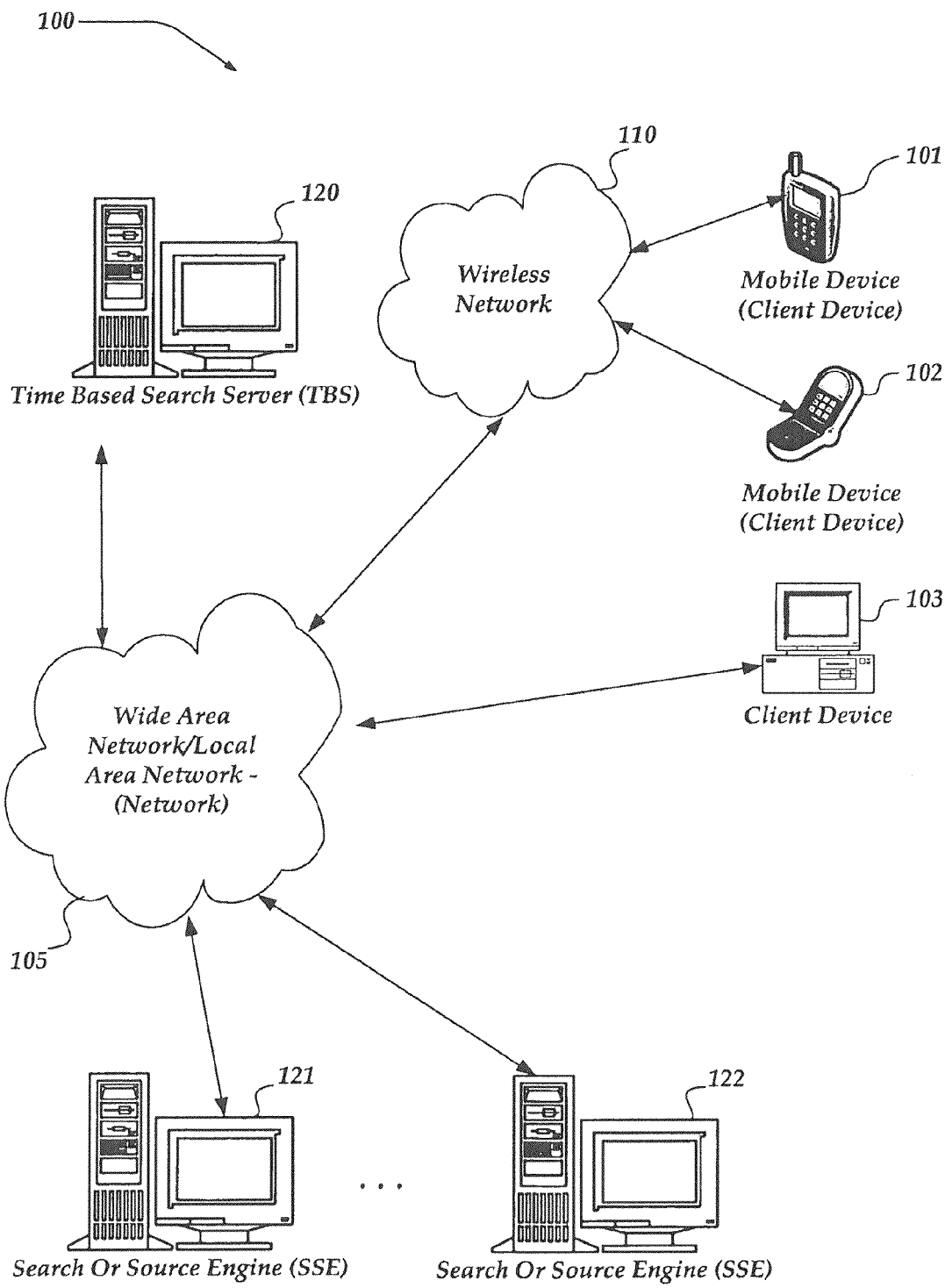
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on," As used herein, the terms "device input" or "user input" refer to a user input command at a device.

As used herein, the term "pattern keyword" refers to a term in a search query which matches a pattern. Examples of pattern keywords include tracking numbers, zip codes, phone numbers, international standard book numbers (ISBNs), addresses, stock symbols, airport codes, or any other pattern.

As used herein, the term "geographic location" refers to any information useable in identifying a position or area in three-dimensional space. A location may include geographic names, zip codes, area codes, landmarks, geographic features, or the like. A location may be determined by a time zone (e.g., between longitude divisions). A location may also include any coordinate based value, e.g., based on a geographical coordinate system provided by a lookup mechanism, triangulation mechanism, or by any other location identification system, including GPS. Lookup mechanisms include IP address to location mappings, MAC address to location mappings, zip code lookup, or the like.

As used herein, the term "time information" refers to information comprising a date, time of day, or the like. Time information may also include information identifying a geographic location, including a time zone (e.g., the 24 longitude divisions of the Earth's surface). As used herein, the term "current time information" refers to time information corresponding to a device's generated or determined time.

As used herein, the term "rule" refers to a mapping between at least one criterion and at least one action. The at least one criterion may be arranged as a Boolean operation. If the at least one criterion and/or the Boolean operation is triggered, the action(s) may be performed. The action(s) may be performed by a device. As used herein, a "time rule" refers to a rule which maps at least a current time information to at least one action.

Briefly, the present invention is directed to providing information over a network. A search query may be received. If the search query includes at least one keyword matching a pattern associated with a specific search engine, a plurality of search results is retrieved from the specific search engine based on the keyword, and the plurality of search results is provided. A plurality of potential search or source engines may be determined based on a current time information. At least one of the potential search or source engines may be a personalized source engine. At least one plurality of results may be retrieved from at least one of the potential search or source engines. The result may be based on the search query. An aggregated result may be determined based on a time rule and/or the current time information. The aggregated result may comprise the plurality of results, Illustrative Operating Environment FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, time based search server (TBS) 120, search or source engines (SSE) 121-122, mobile devices (client devices) 101-102, and client device 103.

One embodiment of mobile devices 101-102 is described in more detail below in conjunction with FIG. 2. Generally, however, mobile devices 101-102 may include virtually any portable computing device capable of receiving and sending a message over a network, such as network 105, wireless networks 110-111, or the like. Mobile devices 101-102 may also be described generally as client devices that are configured to be portable. Thus, mobile devices 101-102 may include virtually any portable computing device capable of connecting to another computing device and receiving information. Such devices include portable devices such as, cellular telephones, smart phones, display pagers, radio frequency (RE) devices, infrared (IR) devices, Personal Digital Assistants (PDAs), handheld computers, laptop computers, wearable computers, tablet computers, integrated devices combining one or more of the preceding devices, and the like. As such, mobile devices 101-102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 101-102 also may include at least one other client application that is configured to receive content from another computing device. The client application may include a capability to provide and receive textual content, media content, and the like. The client application may further provide information that identifies itself, including a type, capability, name, and the like. In one embodiment, mobile devices 101-102 may uniquely identify themselves through any of a variety of mechanisms, including a phone number, Mobile Identification Number (MIN), an MSISDN, an electronic serial number (ESN), or other mobile device identifier. In one embodiment, the MSISDN may comprise a. Country Code (CC), National Destination Code (NDC) which may identify at least one or part of a public land mobile network (PLMN), and a Subscriber Number (SN). The information may also indicate a content format that the mobile device is enabled to employ. Such information may be provided to TBS 120, or other computing devices.

Mobile devices 101-102 may further be configured to include a client application that enables the end-user to log into an end-user account that may be managed by another computing device, such as client device 103. Such end-user account, for example, may be configured to enable the end-user to customize settings, rules, or the like.

Client devices 101-103 may include virtually any computing device capable of communicating over a network to send and receive information. One embodiment of client device 101 is described in more detail below in conjunction with FIG. 2. Generally however, the set of such devices may include devices that typically connect using a wired or wireless communications medium such as personal computers, multiprocessor systems, microprocessor-based or programmable consumer electronics, network PCs, or the like.

Wireless network 110 is configured to couple mobile devices 101-102 and its components with network 105. Wireless network 110 may include any of a variety of wireless sub-networks that may further overlay stand-alone ad-hoc networks, and the like, to provide an infrastructure-oriented connection for mobile devices 101-102. Such sub-networks may include mesh networks, Wireless LAN (WLAN) networks, cellular networks, and the like. In one embodiment, the system may comprise more than one wireless network.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. In one embodiment, at least a portion of wireless network 110 comprises a Public Land Mobile Network (PLMN), a Public Telephone Switching Network (PTSN), Gateway Mobile Switching Centers (GMSCs), or the like.

Wireless network 110 may further employ a plurality of access technologies including 2nd (2G), 3rd (3G) generation radio access for cellular systems, WLAN, Wireless Router (WR) mesh, and the like. Access technologies such as 20, 30, and future access networks may enable wide area coverage for mobile devices, such as mobile devices 101-102 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 101-102 and another computing device, network, and the like. As shown, wireless network 110 provides a communication mechanism for mobile device 101-102, and wireless network 110 provides a communication mechanism for mobile device 104.

Network 105 is configured to couple TBS 120 and its components with other computing devices, including, mobile devices 101-102 through wireless network 110, client device 103, and/or SSE 121-122. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, fall or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In one embodiment, network 105 may be configured to transport information over an Internet Protocol (IP). In essence, network 105 includes any communication method by which information may travel between SSE 121-122, TBS 120, client device 103, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of TBS 120 is described in more detail below in conjunction with FIG. 3. Briefly, however, TBS 120 may include any computing device capable of connecting to network 105 to manage and/or provide ordered mobile content to client devices 101-103. TBS 120 may receive a search query and/or a current time information from at least one of client devices 101-103 over networks 105 and/or 110.

TBS 120 may act as a search aggregator for SSE 121-122. In one embodiment, TBS 120 may send the search query and/or a current time information to at least one of SSE 121-122 over network 105, TBS 120 may receive from the at least one of SSE 121-122 a plurality of search results based on the search query over network 105. TBS 120 may determine the aggregated search result comprising the plurality of search results based on a time rule. TBS 120 may retrieve a time rule stored locally, or received over networks 105 or 110. A selected search result included within the aggregated search result may be modified based on a type of the selected search result and a time included within the current time information.

In another embodiment, TBS 120 may simply retrieve at least one result from at least one of SSE 121-122 based on an identity of a user of client devices 101-103 and/or an identity of client devices 101-103. In one embodiment, the retrieved result may be from a personalized source engine, data source, or the like for the user and/or client devices 101-103. TBS 120 may determine and provide an aggregated result based on the retrieved result, a received current time information and/or a time rule.

In one embodiment, TBS 120 may also operate as a time server. TBS 120 may generate a time based on the settings of a device, the geographic location of the device, or the like. TBS 120 may send a time synchronization message to client devices 101-103 over networks 105 and/or 110.

Although FIG. 1 illustrates TBS 120 as a single computing device, the invention is not so limited. For example, one or more functions of TBS 120 may be distributed across one or more distinct computing devices. For example, managing search queries, retrieving plurality of search results, aggregating plurality of search results, and the like may be performed by a plurality of computing devices without departing from the scope or spirit of the present invention.

SSE 121-122 may include any computing device configured to perform to provide information over a network. In one embodiment, SSE 121-122 may include at least one search engine. SSE 121-122 may perform any variety of search techniques, including an inverse lookup search, use of a latent semantic distance, clustering, information gain, or the like. SSE 121-122 may also be components of TBS 120. SSE 121-122 may be configured to respond to any search query, or may accept a specific pattern or format. In any case, SSE 121-122 may provide search results over networks 105 or 110 to another device. SSE 121-122 may provide search results of a particular type, including Internet, weather, sports, entertainment, movie, stock, news, shopping, playable media, event, scientific, traffic, dining, personalized information, or other types of results.

In one embodiment, SSE 121-122 may be configured to provide personalized information for a user, a group of users, or the like. At least one of SSE 121-122 may include at least one personalized source engine. At least one of SSE 121-122 may be configured to provide results for a user of at least one of client devices 101-103. The user may provide a selection of configuration(s) of SSE 121-122 over networks 105 and/or 110. The user may configure SSE 121-122 to provide news, financial, gossip information, or the like. In one embodiment, a request to provide results from a personalized source engine may be sent from one of client devices 101-103, through networks 110 and 105. The request may comprise an identifier identifying the user and/or associated client device, TBS 120 may receive the request associated with the user and may retrieve result(s) based on the user's preference(s) or selection(s) from at least one of SSE 121-122.

Illustrative Mobile Device

Figure 2:
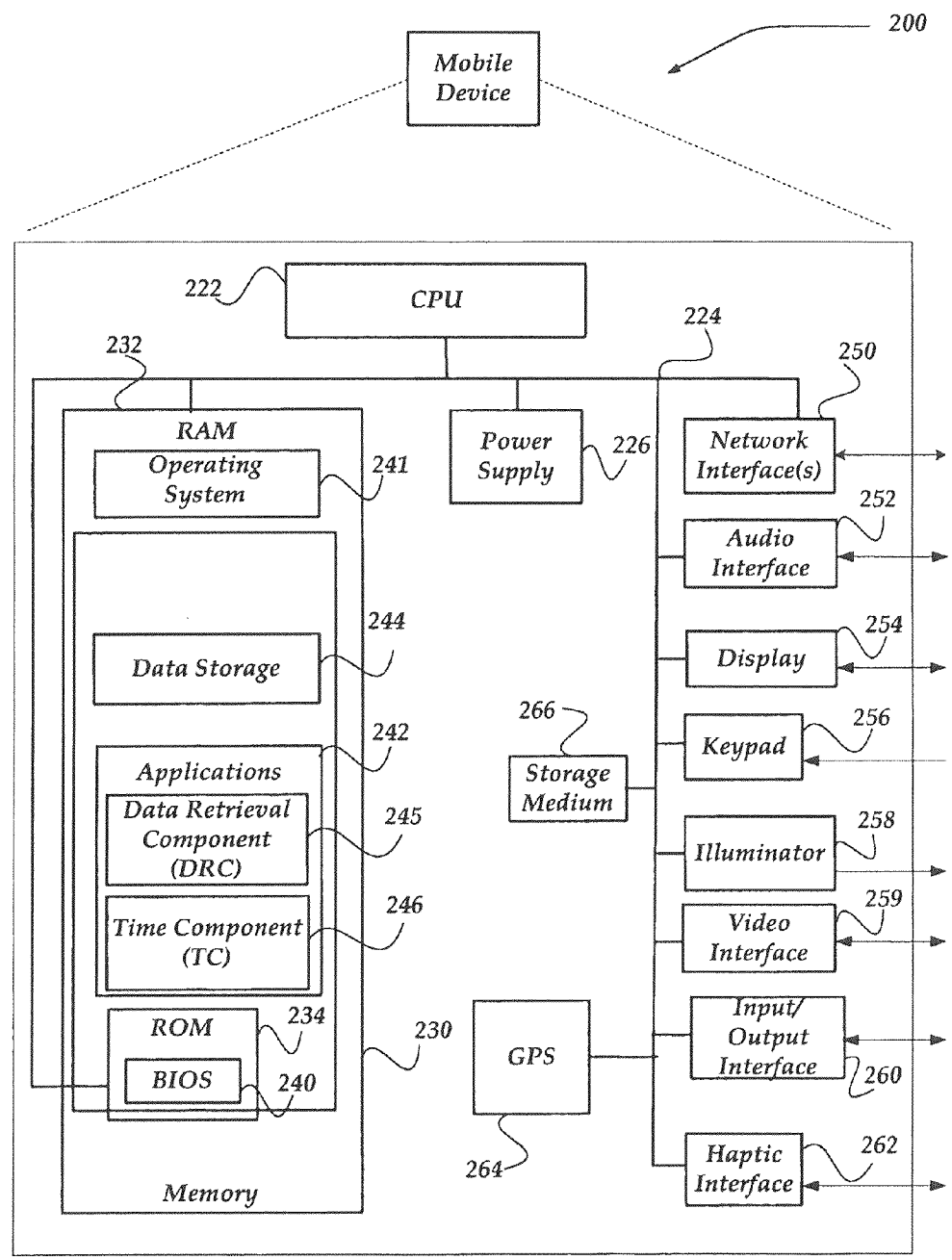
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 101-102 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning system (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (CPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a geographic location as latitude and longitude values, GPS transceiver 264 can also employ other geo-positioning mechanisms, including, but not limited to, triangulation, assisted UPS (ALPS), E-OTD, CI, SAI, ETA, BSS or the like, to further determine the physical geographic location of mobile device 200 on the surface of the Earth. It is understood that under different conditions, UPS transceiver 264 can determine a physical geographic location within millimeters for mobile device 200; and in other cases, the determined physical geographic location may be less precise, such as within a meter or significantly greater distances. In one embodiment, however, mobile device may through other components, provide other information that may be employed to determine a physical geographic location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device, including being sent as part of a header during a communication, sent upon request, or the like. Moreover, data storage 244 may also be employed to store media content and/or social networking information including text messages, address books, group member lists, or the like. At least a portion of the media content nay also be stored on storage medium 266, such as a disk drive, removable storage, or the like within mobile device 200.

Applications 242 may include computer executable instructions which, when executed by mobile device 200, provide such functions as calendars, contact managers, task managers, transcoders, database programs, word processing programs, screen savers, security applications, spreadsheet programs, games, search programs, and so forth. Applications 242 may further include Data Retrieval Component (DRC) 245 and Time Component (TC) 246.

DRC 245 represents any of a variety of applications configured to send time information and to receive, display and/or otherwise process results, in one embodiment, DRC 245 may be configured to send time information periodically over network interface(s) 250. In one embodiment, DRC 245 may be configured to send a search query over network interface(s) 250. In one embodiment, DRC 245 may send the search query to, for example, a search aggregator. In one embodiment, DRC 245 may be a component of any of a variety of browser applications, which may run under the control of operating system 241 to enable and manage requesting, receiving, and rendering markup pages such as WAP pages (sometimes referred to as WAP cards), SMGL, HTML, HDML, WML, WMLScript, JavaScript, and the like. DRC 245 may also be configured to receive, store and/or provide data. For example, in one embodiment, browser 246 may receive and store client device data in the form of a cookie, or the like.

TC 246 includes any component configured to receive, provide, determine or otherwise process a time information. In one embodiment, TC 246 may send the current time information over network interface(s) 250, to, for example, a search aggregator, in one embodiment, TC 246 may be a component of any of a variety of browser applications or DRC 245, which may run under control of operating system 241. In another embodiment, TC 246 may be a separate process or program in communication with DRC 245 or any other application. In another embodiment, TC 246 may directly provide current time information over wireless network 110.

In one embodiment, TC 246 may obtain time, date and/or time zone comprising current time information from operating system 241. TC 246 may invoke system call to retrieve the current time information. In one embodiment, TC 246 requests time, date and/or time zone by making a request to a server providing such information over wireless network 110 using network interface 250. In one embodiment, the original source of the time, date and/or time zone may be a synchronization server. In one embodiment, TC 246 determines time zone by using a geographic location from, for example, GPS 264. In one embodiment, time, date and/or time zone may also be determined by a user preference or user input entered, for example, on input/output interface 260. In one embodiment, TC 246 determines a time zone from a geographic location information determined by user preferences, entered on input/output interface 260, or the like. In one embodiment, DRC 245 and TC 246 may be configured to perform at least some actions described in conjunction with FIGS. 4A, 4B, and 5.

Illustrative Network Device

Figure 3:
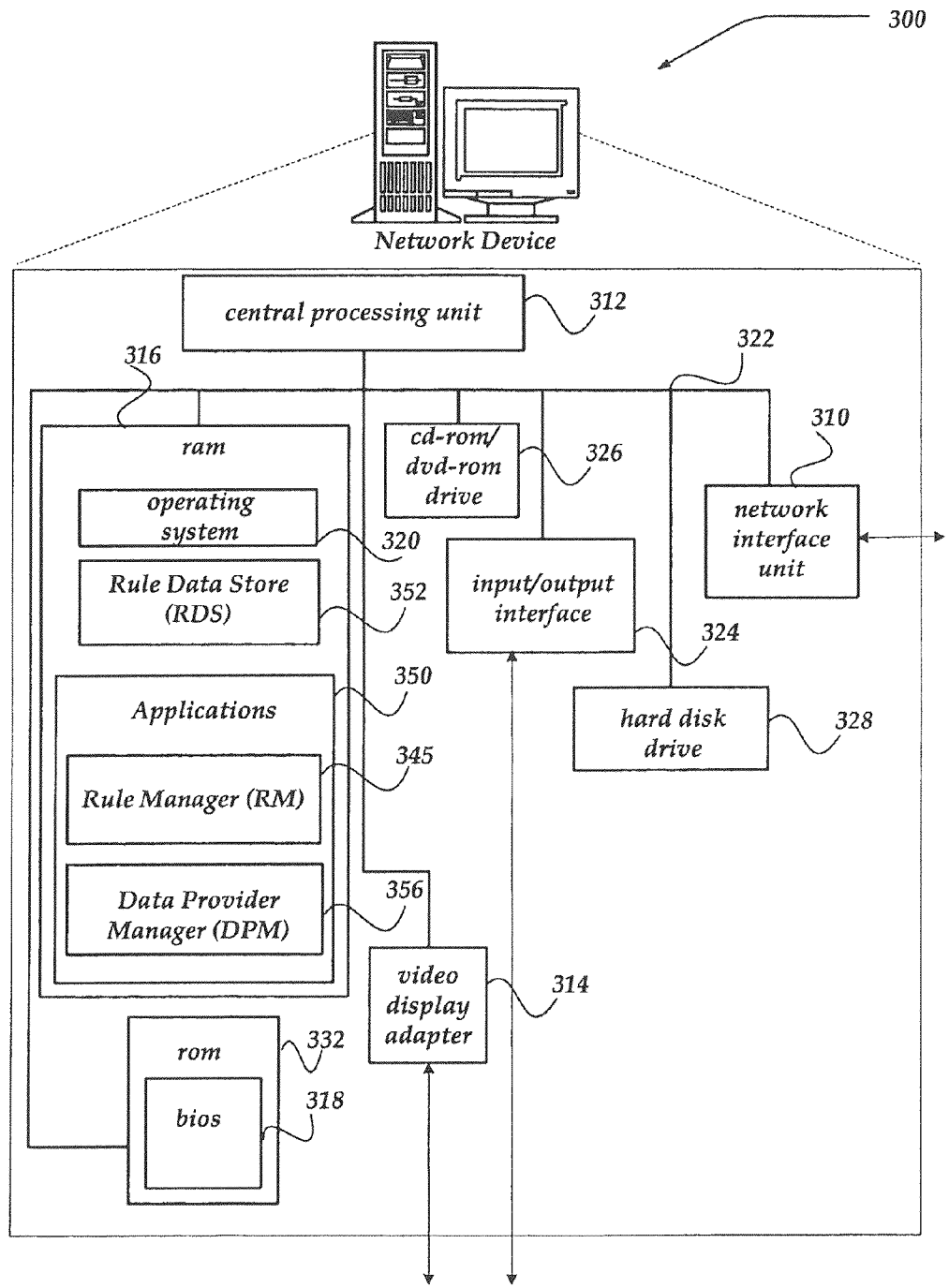
FIG. 3 shows one embodiment of a network device that may be included in a system implementing the invention.

FIG. 3 shows one embodiment of a network device, according to one embodiment of the invention. Network device 300 may include many more components than those shown. Network device 300 may be configured to operate as a server, client, peer, or any other device. The components shown, however, are sufficient to disclose an illustrative embodiment for practicing the invention. Network device 300 may represent, for example, TBS 120 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs (including XmlHTPRequest (XHR), Asynchronous JavaScript and XML (AJAX), or JavaScript Object Notation (JSON) programs), customizable user interface programs, IPSec applications, encryption programs, security programs, account management, and so forth.

Rule Data Store (RDS) 352 includes any component for storing a plurality of rules, including time rules, and associations between the rules, users, devices, or the like. Rules may be stored in RAM 316, hard disk drive, 328, or the like. Rules may also be stored in a database, or the like. In one embodiment, applications 350 may directly read and access rules in RDS 352. In another embodiment, RDS 352 provides rules in response to a request associated with a user ID. Rules may be used at various stages to perform actions, such as those described in FIGS. 4A, 4B, and 5. Examples of time rules and data structures for storing the time rules are described in more detail below in conjunction with FIG. 6.

Rule Manager (RM) 354 includes any component for retrieving, customizing, or otherwise managing rules, including time rules. In one embodiment, RM 354 may receive over network interface unit 310 a request to create, modify, or delete a rule. RM 354 may enable customizing at least one time criterion of the time rule or at least one action of the time rule for modifying the aggregated search result. RM 354 may manage the rules within RDS 352. RM 354 may provide web pages or other interfaces for managing the rules.

Data Provider Manager (DPM) 356 includes any component for providing data based on a received time information. In one embodiment DPM 356 may be configured to route a search request, aggregating a plurality of search results, or otherwise managing searching. In one embodiment, DPM 356 may act as a search aggregator. DPM 356 may send a search query over network interface unit 310 to at least one search engine. Alternately, or additionally, DPM 356 may send the search query to a search engine executing on device 300 within, for example, applications 350. In one embodiment, DPM 356 may determine a plurality of potential search engines based on a time rule received from RM 354 or RDS 352. In one embodiment, DPM 356 may determine an aggregated search result comprising a plurality of search results based on a time rule, wherein a selected search result included within the aggregated search result is modified based on a type of the selected search result and a time included within the current time information, or the like.

In one embodiment, DPM 356 may be configured to receive a information identifying a user, a device, or a selection of a personalized source engine. DPM 356 may send the identifying information and the time information to a personalized source engine on device 300 or over network interface unit 310 to another device for processing. DPM 356 may receive at least one result and may aggregate the at least one result based on a time rule.

Figure 4A:
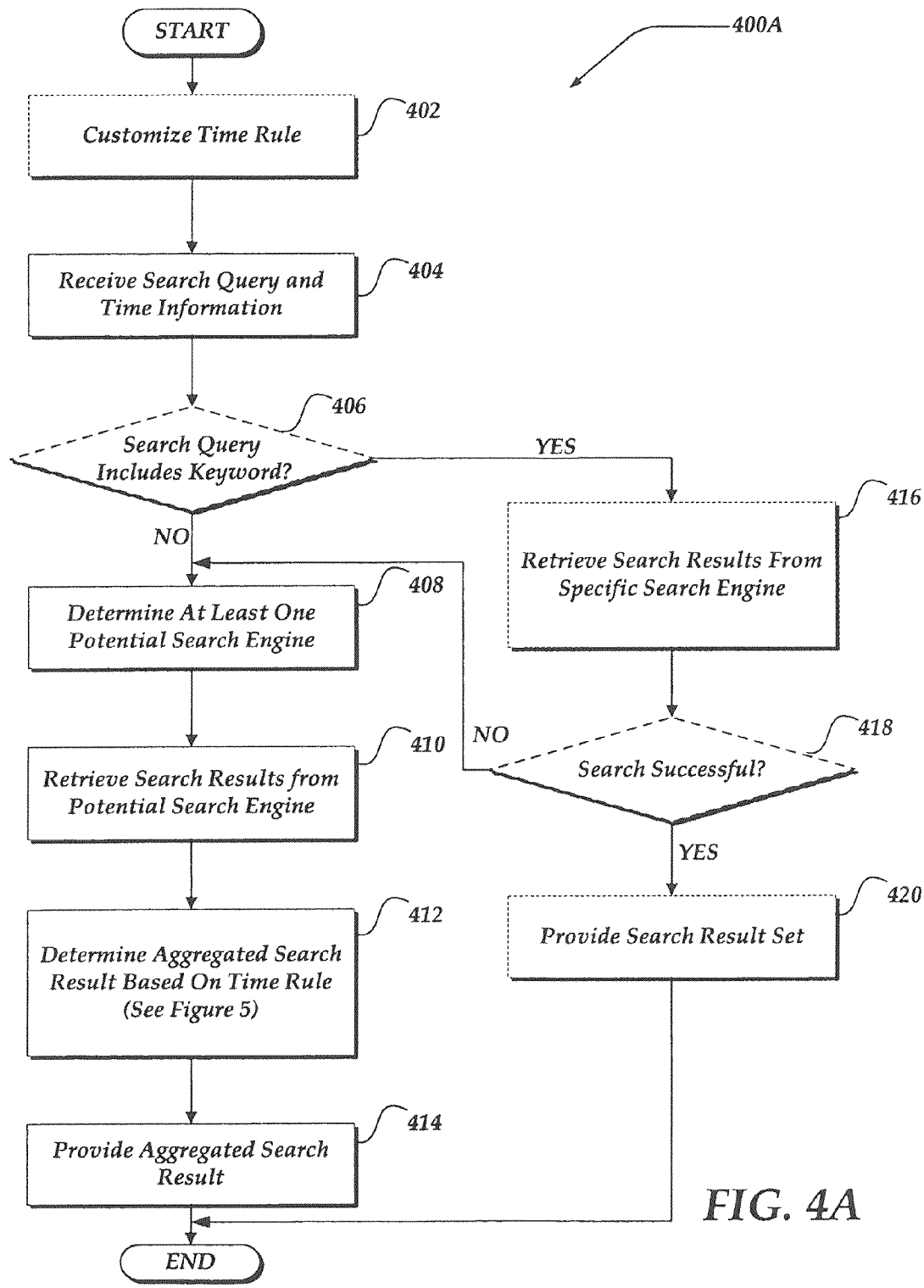
FIGS. 4A-4B illustrate logical flow diagrams generally showing embodiments of processes for providing information to a mobile device over a network in response to a time information.
Figure 4B:
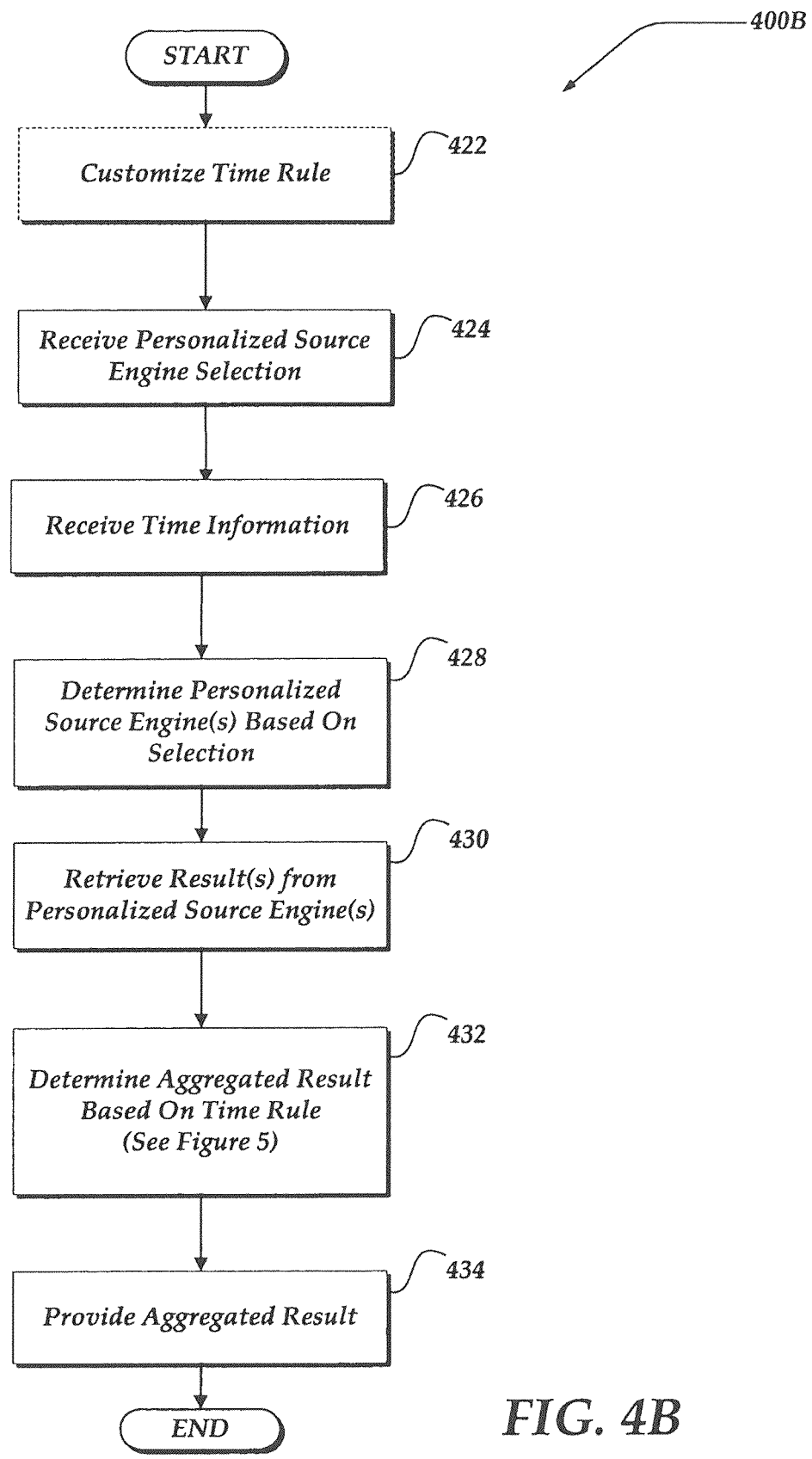
Figure 5:
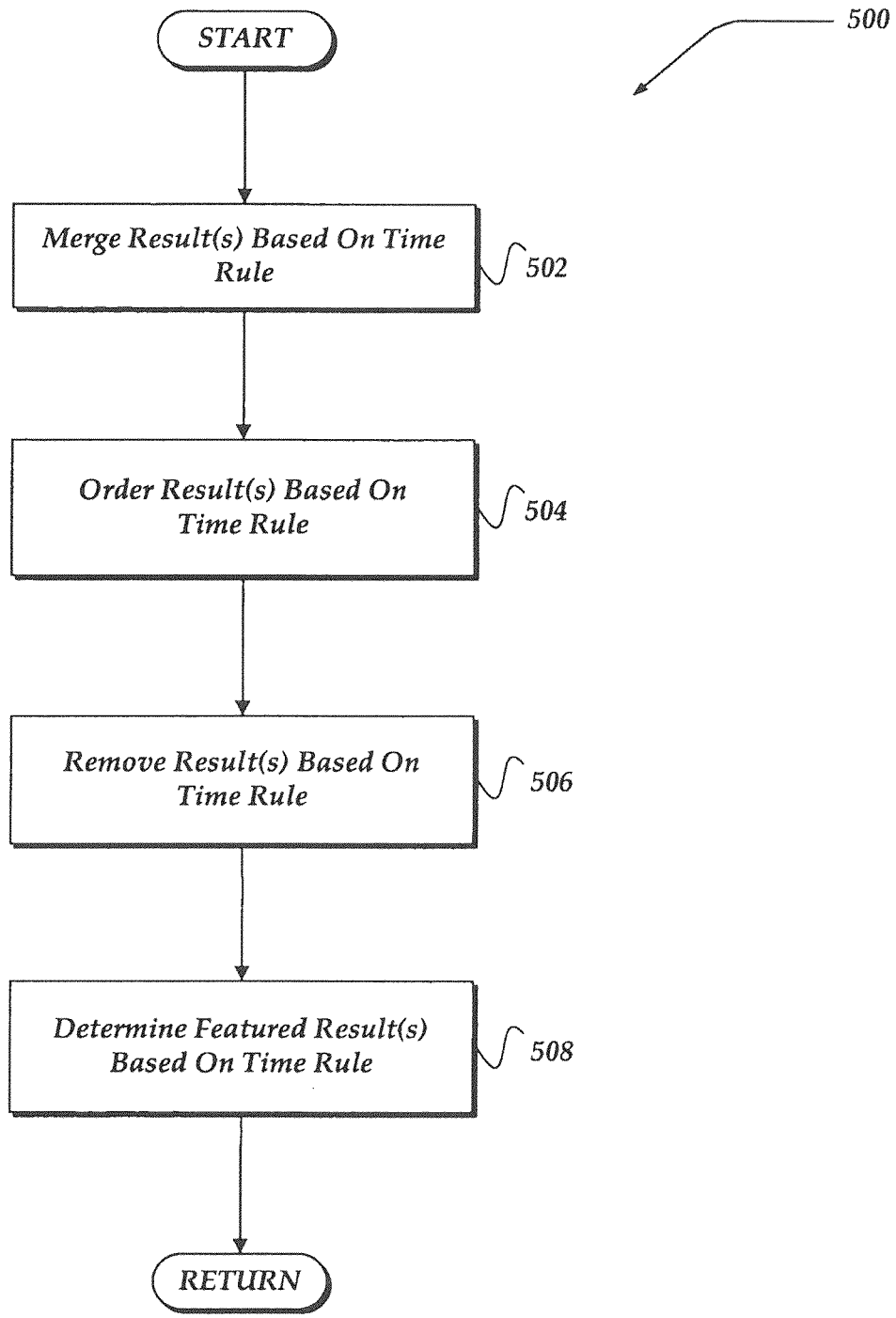
FIG. 5 illustrates a logical flow diagram generally showing one embodiment of a process for determining a aggregated search result.

In one embodiment, RM 354 and DPM 356 may be configured to perform at least some actions described in conjunction with FIGS. 4A, 4B, and 5.

Generalized Operation

The operation of certain aspects of the invention will now be described with respect to FIGS. 4A, 4B, and 5. FIGS. 4A, 4B, and 5 provide logical flow diagrams of certain aspects of the present invention. The processes of FIGS. 4A, 4B, and 5 may be implemented, for example, within TBS 120 of FIG. 1.

FIG. 4A illustrates a logical flow diagram generally showing one embodiment of a process for providing information in response to a time information and a search request. Process 400A begins at optional block 402, where a time rule is customized. The time rule may be customized for a user, device, or the like. In one embodiment, customizing may comprise customizing at least one time criterion of the time rule, at least one action of the time rule for modifying the aggregated search result, or the like.

In one embodiment, customizing may comprise selecting one or more interests. For example, a time rule may be associated with users who identify interest in a specific profession, city, hobby, sport or any other interest. Such selected interest may modify a criterion in the time rule. The time rules and/or mappings between a time rule, a user, or device may be stored in a database, or the like. Processing then continues to block 404.

At block 404, a search query and a current time information is received. In one embodiment, the time rule may be received with the search query. In one embodiment, the search query and current time information may be received in the same communication, or even a separate communication. In one embodiment, a time zone included with the current time information is the time zone in which a device sending the search query and/or current time information is located. In one embodiment, the search query and current time information are received over a plurality of protocols, including Hyper Text Transfer Protocol (HTTP). At least a portion of the current time information may be sent within an Hyper Text Transfer Protocol (HTTP) request. The current time information may be sent in the HTTP header, for example. Processing then continues to decision block 406.

At decision block 406, it is determined if the search query includes at least one pattern keyword matching a pattern associated with a specific search engine. The specific search engine may be associated with particular types of patterns. For example, a stock search engine may be associated with a regular expression pattern matching words of less than 4 length and including capital letters. If a pattern keyword matches a pattern associated with a specific search engine, processing continues to block 416. Otherwise, processing continues to block 408.

At block 416, a plurality of search results based on the pattern keyword is retrieved from the determined specific search engine. The search engine may perform any search technique based on the search query and/or current time information. Processing then continues to decision block 418.

At decision block 418, it is determined if the pattern keyword search on the specific search engine is successful. In one embodiment, if the plurality of search results retrieved from the specific search engine includes at least one search result, the pattern keyword search is determined to be successful, if the pattern, keyword search is unsuccessful, the process continues to block 408. Processing then continues to block 420.

At block 420, the plurality of search results retrieved based on the pattern keyword is provided. In one embodiment, the plurality of search results may be provided as part of an aggregated search result. Processing then returns to a calling process for further processing.

At block 408, a plurality of potential search engines is determined based on a time information and/or geographic location information. The plurality of potential search engines may comprise search engines of a plurality of types. In one embodiment, the search engine may provide results from a selected database, selected information, a personalized data source, or the like. In one embodiment, at least one search engine may be an Internet, weather, sports, entertainment, movie, stock, news, shopping, playable media, event, scientific, dining, or traffic search engines, or the like. Accordingly, a search result returned by the search engine may be of the associated type (Internet, weather, sports, personalized, etc). In one embodiment, at least one of the potential search engine may be a personalized source engine configured to provide searches from user selected data sources, subsets of data sources, filtered data sources, or the like. A user sending the search query may have configured the personalized source engine, for example using a mobile device. The personalized source engine may provide also provide time ordered results, based on a received time from the client/mobile device, a local time, or the like, in any case, in one embodiment, the determination of the potential search engine (s) may comprise obtaining a plurality of potential search engines and/or removing at least one search engine from the plurality or otherwise modifying the plurality based on a time rule. For example, for the time zone EST and an early morning time, the potential search engines may be determined to include East Coast traffic search engines. Processing then continues to block 410.

At block 410, a plurality of search results are retrieved from at least one search engine included in the plurality of potential search engines. In one embodiment, the retrieval may be based on the received search query. In one embodiment, the search query may be modified based on a rule, including a time rule, before being submitting to the potential search engines. Some non-limiting examples include changing a geographic location name to a zip code, appending a search term (e.g. "dinner" or "lunch") to a search query based on the time rule and current time information, or the like. Processing then continues to block 412.

At block 412, an aggregated search result may be determined based on a time rule, time information, geographic location information, and/or the retrieved plurality of search results from the potential search engines. Determining the aggregated search result may be performed by process 500 of FIG. 5. Briefly, in one embodiment, the aggregated search result may comprise the retrieved plurality of search results from one, some, or all of the potential search engines. Each of the plurality of search results may be aggregated using any aggregation mechanism, including merging, sorting, removing duplicates, grouping like results, grouping results by search engines, or the like. For example, search results from a weather search engine may be grouped together, while search results for a traffic search engine may be grouped together, but separate from the weather search results. In one embodiment, a selected search result included within the aggregated search result may be modified based on a type of the selected search result and a time included within the current time information. The selected search results may be ordered, featured, or removed based on a time. In one embodiment, the type may comprise types comprise a first type from a first search engine configured to provide meteorological information from an online database comprising information associating weather and geographic location; a second type from a second search engine configured to provide real-time stock information about a traded company; a third type from a third search engine configured to provide real-time information about at least one traffic condition in at least one geographic location associated with a user of the client device, or the like. Processing then continues to block 414.

At block 414, the aggregated search result is provided. The aggregated search result may be provided in a plurality of ways, including as a response, as a list, as a callback, as web page, as an XML file, or the like. Processing then returns to a calling process for further processing.

In an alternate embodiment, blocks 406, 416, 418, and 420 may be optional and may not be performed. Accordingly, processing is directed to processing aggregated search results for a plurality of search engines.

FIG. 4B illustrates a logical flow diagram generally showing one embodiment of a process for providing information in response to a time information and a personalized source engine selection. Process 400B begins at optional block 422, where a time rule is customized. Block 422 may be substantially similar to block 402 of FIG. 4A. Processing next continues to block 424.

At block 424, a personalized source engine selection is received. In one embodiment, the selection may comprise a configuration of at least one source of information for at least one user. The source of information may comprises, news, entertainment, traffic, weather, stock information, or the like. The configuration may specify that a particular type of news may be retrieved from a particular source engine. For example, news and weather may be retrieved from free source engine, whereas stock information may be retrieved from paid source engine. Processing then continues to block 426.

At block 426, a time information is received. In one embodiment, a client device may periodically send a time information. In one embodiment, a time zone included with the current time information is the time zone in which a device sending the current time information is located, in one embodiment, the current time information is received over a plurality of protocols, including Hyper Text Transfer Protocol (HTTP). Processing then continues to block 428.

At block 428, at least one personalized source engine is determined based on the selection. In one embodiment, a user identifier, device identifier, or other identifying information may be received (e.g., with the time information). Based on the selection and/or identifier, the source engine(s) may be determined. For example, referring to FIG. 6, for a selection represented by row seven (7) of rows 620 and for user Client3, the engine "Personalized Src" may be determined to be used. Processing then continues to block 430.

At block 430, at least one result may be retrieved from at least one determined personalized source engine. In one embodiment, the retrieval may be based on the selection and/or identifier. For example, for Client3's selection, news and traffic information may be retrieved from engine "Personalized Src." Processing then continues to block 432.

At block 432, an aggregated result may be determined based on a time rule, time information, geographic location information, and/or the retrieved plurality of results from the potential source engine(s). Determining the aggregated result may be performed by process 500 of FIG. 5. Processing then continues to block 434.

At block 434, the aggregated result may be provided. Block 434 may be substantially similar to block 414. Processing may loop back to block 426 if there are other time information received. Otherwise, processing returns to a calling process for further processing.

FIG. 5 illustrates a logical flow diagram generally showing one embodiment of a process for determining the aggregated result based on the at least one plurality of results.

Process 500 begins at optional block 502. At block 502, at least two pluralities of results from at least two potential search or source engines may be merged. The pluralities of results may be merged based on at least one time rule and/or another rule. In one embodiment, the plurality of results may be merged if a current time is beyond a threshold, a current time zone is one of a selected time zone, or the like. Non-time rules may be based on a similarity between the plurality of results, a mapping between pre-defined mergeable groups and search or source engines, a configured visual configuration for the display of the aggregated result, or the like. For example, the merging of two or more pluralities of results may involve the removal of duplicated and/or similar results included in the plurality of results. Processing then continues to block 504.

At block 504, the plurality of results is ordered or otherwise promoted based on a time rule. The plurality of results may also be ordered or otherwise promoted within the aggregated result. In one embodiment, the plurality of results or a selected result within the plurality may be ordered higher if a current time is beyond a threshold, a current time zone is one of a selected time zone, or the like. For example, referring to FIG. 6 for row (5) of rows 620, for a time earlier than 10 AM, and a time zone of EST, traffic results (e.g., results from a traffic search or source engine, or any other results determined to be associated with traffic information) may be ordered higher in the aggregated result. In one embodiment, the process of ordering may be based on a configured visual configuration for a display of the aggregated result, such as limiting the results to a limited dimension screen. In one embodiment, each of the results may be ordered individually or as a group (e.g., weather, traffic, personalized, etc). Processing then continues to block 506.

At block 506, at least one result may be removed based on a time rule. In one embodiment, the at least one result may be removed based on its ordering based on its grouping, based on a configured visual configuration for the display of the aggregated result, or the like. For example, for early mornings, entertainment based results may be ordered lower or even last in the aggregated result. Based on a limit on the size of the aggregated result, the lower ordered results, such as entertainment results may be removed. Processing then continues to optional block 508.

At block 508, at least one featured result may be determined. In one embodiment, block 508 may be optional and may not be performed. In one embodiment, a featured result may be determined based on a time based mapping and/or indicated in the aggregated result. In one embodiment, based on the time and/or time zone, a type or group of result(s) may be featured. For example, for EST, and for an early morning time, breakfast food results may be featured. The results may be returned by a dining engine, and tagged as breakfast, using meta-tags, keywords, or the like. In another embodiment, a type or group of result(s) may be featured independently of the time or time zone (e.g., stock market information during trading hours). Processing then continues to a calling process for further processing.

It will be understood that each block of a flowchart illustration need not be limited in the ordering shown in the illustration, and might be performed in any ordering, or even performed concurrently, without departing from the spirit of the invention. It will also be understood that each block of the flowchart illustration, and combinations of blocks in the flowchart illustration, can be implemented by computer program instructions. These program instructions might be provided to a processor to produce a machine, such that the instructions, which execute on the processor, create means for implementing the actions specified in the flowchart block or blocks. The computer program instructions might be executed by a processor to cause a series of operational steps to be performed by the processor to produce a computer implemented process such that the instructions, which execute on the processor to provide steps for implementing the actions specified in the flowchart, block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Data Structure

FIG. 6 shows one embodiment of a plurality of time rules in accordance with the present invention. Other types of rules, data structures, or the like may be used without departing from the scope of the invention. While rule set 600 of FIG. 6 is shown as a table, other data structures including an expert system, neural network, decision tree, or the like may also be used. As shown, rule set 600 includes a plurality of rules 620. Each rule may include at least one criterion for firing the rule, and one action to be taken when the rule is fired. As shown, rule set 600 includes the following criteria: user(s) 602, pattern 604, and time 608. Rule set 600 also includes action 612 for search or source engine 610. Other criteria or actions or fewer criteria may be used without departing from the scope of the invention. As shown, the rule may be fired based on a variety of events, including based on a search from a particular user or a class of users matching one of user(s) 602, a search query matching one of pattern 604, and a time matching one of time 608. At least some of the criteria may be blank and thus may match any appropriate user, pattern, time/time zone, or the like. In one embodiment, the time criterion may match a time and time zone, only a time, only a time zone, or the like. Pattern 604 may include any pattern, including regular expression patterns. Time 608 may include time ranges, time zones (EST, PST, etc), a label representing a time of date or calendar time, or the like.

Engine 610 may identify a specific engine (e.g., SearchEngine0) or a class of engines (_SE-NEWS). Action 612 defines an action to take on a search result or a plurality of search results (search result set), including ordering, featuring, or removing the search result/search result set. As shown, the ordering includes promoting the item by a factor (e.g. +1, +2, etc). Thus, a search result may be ordered higher in a list. As an example, the first entry in rules 620 specifies that for user Client0, with a search query matching any pattern, and a time matching the label _ENTERTAINMENT (e.g., 8:00 PM-2:00 AM), the SearchEngine0 should be used for the search and the search results from SearchEngine0 should be promoted by a factor of 1. In one embodiment, an individual search result may be moved up an aggregated search result by one (1), or all or some search results from SearchEngine0 may be moved up by a factor of 1.

Action 612 also includes action to be performed on search engines. For example, for searches in the EST time zone, the SearchEngine1 may be promoted in a search engine list, in accordance with the present invention. Other actions include removing a search engine from a search engine list.

The above specification, examples, and data provide a complete description of the manufacture and use of the composition of the invention. Since many embodiments of the invention can be made without departing from the spirit and scope of the invention, the invention resides in the claims hereinafter.

What is claimed as new and desired to be protected by Letters Patent of the United States is:

1. A computing device, comprising:
a memory device for storing computer instructions; and
a processor that executes computer instructions to perform actions, comprising:
receiving a search query from a client device;
determining a time rule that maps at least received time information to at least one action; and
when it is determined that the search query fails to include at least one pattern keyword, then performing actions, comprising:
selecting a plurality of search engines based on the time rule, wherein at least one of the plurality of search engines is directed to search a different type of content from the plurality of search engines;
aggregating search results from the plurality of search engines based on the time rule by at least removing duplicate search results, and grouping the search results based on at least one criterion; and
communicating for display at the client device, at least a portion of the aggregated search results.

2. The computing device of claim 1, wherein the processor performs actions further comprising:
customizing the time rule to include at least one action that modifies the aggregated search results.

3. The computing device of claim 1, wherein the at least one criterion for grouping the search results includes at least one of grouping the search results based on a time included within the received time information, a search result type, or a search engine.

4. The computing device of claim 1, wherein aggregating search results from the plurality of search engines based on the time rule further comprises ordering the search results using the time rule.

5. The computing device of claim 1, wherein the received time information further comprises geographic information associated with at least one of a time zone or a network address associated with the client device.

6. The computing device of claim 1, wherein the time rule is further associated with at least one of a specific profession, city, hobby, sport, or interest of a user of the client device.

7. The computing device of claim 1, wherein at least one of the displayed search results is tagged based on the time rule, the tag being displayed with the tagged search results.

8. A network device, comprising:
a transceiver for receiving and sending data; and
one or more processors that operates on the data to perform actions, comprising:
receiving a search query from a client device;
determining a time rule that maps at least received time information to at least one action; and
when it is determined that the search query fails to include at least one pattern keyword, then performing actions, comprising:
selecting a plurality of search engines based on the time rule, wherein at least one of the plurality of search engines is directed to search a different type of content from the plurality of search engines;
aggregating search results from the plurality of search engines based on the time rule by at least removing duplicate search results, and grouping the search results based on at least one criterion; and
communicating for display at the client device, at least a portion of the aggregated search results.

9. The network device of claim 8, wherein the one or more processors perform actions, further comprising:
when it is determined that the search query includes at least one pattern keyword:
determining a specific search engine based on the at least one pattern keyword;
employing the specific search engine to obtain a plurality of search results; and
communicating the plurality of search results to the client device.

10. The network device of claim 8, wherein the one or more processors perform actions, further comprising:
  customizing the time rule to include at least one action that modifies the aggregated search results.

11. The network device of claim 8, wherein the at least one criterion for grouping the search results includes at least one of grouping the search results based on a time included within the received time information, a search result type, or a search engine.

12. The network device of claim 8, wherein aggregating search results from the plurality of search engines based on the time rule further comprises ordering the search results using the time rule.

13. The network device of claim 8, wherein the received time information further comprises geographic information associated with at least one of a time zone or a network address associated with the client device.

14. The network device of claim 8, wherein the time rule is further associated with at least one of a specific profession, city, hobby, sport, or interest of a user of the client device.

15. A non-transitory computer-readable storage device that stores computer-executable instructions thereon that when installed into a computing device performs actions, comprising:
  receiving a search query from a client device;
  determining a time rule that maps at least received time information to at least one action; and
  when it is determined that the search query fails to include at least one pattern keyword, then performing actions, comprising:
   selecting a plurality of search engines based on the time rule, wherein at least one of the plurality of search engines is directed to search a different type of content from the plurality of search engines;
   aggregating search results from the plurality of search engines based on the time rule by at least removing duplicate search results, and grouping the search results based on at least one criterion; and
   communicating for display at the client device, at least a portion of the aggregated search results.

16. The non-transitory computer-readable storage device of claim 15, wherein the actions, further comprising:
  when it is determined that the search query includes at least one pattern keyword:
   determining a specific search engine based on the at least one pattern keyword;
   employing the specific search engine to obtain a plurality of search results; and
   communicating the plurality of search results to the client device.

17. The non-transitory computer-readable storage device of claim 15, wherein when it is determined that the search query fails to include at least one pattern keyword, then performing actions, comprising:
  modifying the search query based on the time rule that maps at least the received time information to at least one action that includes an aggregated search result determination and search engine determination.

18. The non-transitory computer-readable storage device of claim 15, wherein at least one of the displayed search results is tagged based on the time rule, the tag being displayed with the tagged search results.

19. The non-transitory computer-readable storage device of claim 15, wherein the actions, further comprising:
  customizing the time rule to include at least one action that modifies the aggregated search results.

20. The non-transitory computer-readable storage device of claim 15, wherein the at least one criterion for grouping the search results includes at least one of grouping the search results based on a time included within the received time information, a search result type, or a search engine.

* * * * *